(12) United States Patent
Kuboi et al.

(10) Patent No.: US 10,429,635 B2
(45) Date of Patent: Oct. 1, 2019

(54) COLOR CHANGEABLE OPTICAL FILTER AND EYEGLASSES INCLUDING SAME

(71) Applicant: Mitsui Chemicals, Inc., Tokyo (JP)

(72) Inventors: Hironori Kuboi, Ogori (JP); Hidetaka Tsukada, Omuta (JP); Shoko Matsumura, Icihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 14 days.

(21) Appl. No.: 15/548,016

(22) PCT Filed: Jan. 29, 2016

(86) PCT No.: PCT/JP2016/052604
§ 371 (c)(1),
(2) Date: Aug. 1, 2017

(87) PCT Pub. No.: WO2016/125694
PCT Pub. Date: Aug. 11, 2016

(65) Prior Publication Data
US 2018/0017780 A1    Jan. 18, 2018

(30) Foreign Application Priority Data
Feb. 2, 2015   (JP) .................................. 2015-018203

(51) Int. Cl.
*G02B 5/30*    (2006.01)
*G02B 26/00*   (2006.01)
(Continued)

(52) U.S. Cl.
CPC ............. *G02B 26/007* (2013.01); *G02B 5/20* (2013.01); *G02B 5/30* (2013.01); *G02B 27/288* (2013.01);
(Continued)

(58) Field of Classification Search
CPC ...... G02B 26/007; G02B 27/288; G02B 5/20; G02B 5/30; G02B 5/3033; G02B 1/10;
(Continued)

(56) References Cited

U.S. PATENT DOCUMENTS

| | | | | |
|---|---|---|---|---|
| 5,114,218 A | * | 5/1992 | Black | G02C 7/101 351/158 |
| 5,982,463 A | | 11/1999 | Yamaguchi et al. | |
| 7,916,152 B2 | * | 3/2011 | Jones | G06T 11/001 345/582 |

FOREIGN PATENT DOCUMENTS

| | | |
|---|---|---|
| CN | 2279624 Y | 4/1998 |
| CN | 201352277 Y | 11/2009 |

(Continued)

OTHER PUBLICATIONS

Ellenbogen, Tal, et al. "Chromatic Plasmonic Polarizers for Active Visible Color Filtering and Polarimetry." Nano Letters, vol. 12, No. 2, 2012, pp. 1026-1031. (Year: 2012).*
(Continued)

*Primary Examiner* — William R Alexander
*Assistant Examiner* — Henry A Duong
(74) *Attorney, Agent, or Firm* — Brundidge & Stanger, P.C.

(57) ABSTRACT

Disclosed are: a practical color changeable optical filter that can change hue or saturation by a relatively simple structure, the color changeable optical filter including two or more polarizers 20, 30 containing a dichroism pigment and a frame 10 that supports the polarizers 20, 30, wherein a polarization plane of light incident on at least one polarizer 30 or a polarization plane of light output from at least one polarizer 20 is rotated relatively, whereby the hue or saturation of light passing through the optical filter is changed; and eyeglasses provided with the color changeable optical filter.

10 Claims, 3 Drawing Sheets

(51) Int. Cl.
  *G02B 5/20* (2006.01)
  *G02C 7/10* (2006.01)
  *G02C 7/12* (2006.01)
  *G02B 27/28* (2006.01)

(52) U.S. Cl.
  CPC ............... *G02C 7/10* (2013.01); *G02C 7/104* (2013.01); *G02C 7/12* (2013.01)

(58) Field of Classification Search
  CPC . G02C 7/104; G02C 7/10; G02C 7/12; G02C 7/02; B29D 11/0073
  USPC ..................................................... 351/159.56
  See application file for complete search history.

(56) References Cited

FOREIGN PATENT DOCUMENTS

| CN | 102499811 A | 6/2012 |
| JP | 48-085253 A | 11/1973 |
| JP | 51-161816 U | 12/1976 |
| JP | 52-094147 A | 8/1977 |
| JP | 53-016447 U | 2/1978 |
| JP | 54-034737 U | 3/1979 |
| JP | 58-126431 U | 8/1983 |
| JP | 10-096887 A | 4/1998 |
| JP | 2008-070400 A | 3/2008 |
| JP | 2008-181064 A | 8/2008 |

OTHER PUBLICATIONS

International Search Report from International Application No. PCT/JP2016/052604 dated May 10, 2016.

\* cited by examiner

COLOR CHANGEABLE OPTICAL FILTER AND EYEGLASSES INCLUDING SAME

TECHNICAL FIELD

The present invention relates to a color changeable optical filter that changes the hue or chroma of transmitted light by rotation of the polarization plane and eyeglasses including the color changeable optical filter. More particularly, the present invention relates to, for example, a color changeable optical filter useful for dedicated eyeglasses which enables a color-blind person to distinguish between red and green by changing the hue or chroma.

BACKGROUND ART

Conventionally, as dedicated eyeglasses for a color-blind person to distinguish between red and green, there are eyeglasses using, for example, a red filter (or green filter). However, using such dedicated eyeglasses are not preferred by a color-blind person because it enables others to recognize that he/she is color-blind. Further, since a color-blind person generally uses the dedicated eyeglasses only when there is a need to distinguish between red and green, taking on and off the eyeglasses from time to time is very cumbersome.

PTL 1 discloses electronic sunglasses capable of controlling various colors displayed by using liquid crystal materials for each of red, green, and blue. The electronic sunglasses are, however, for use as sunglasses that display color according to user's taste, such as individual's preference, location, and fashion, and no consideration is given to the application as dedicated eyeglasses for a color-blind person. Further, the control structure of the electronic sunglasses uses a cholesteric liquid crystal material to reflect light having a certain wavelength, and the complexity of the structure and necessity of a large number of components make the electronic sunglasses impractical.

PTL 2 relates to the field of liquid crystal display panels instead of eyeglasses, but discloses a color liquid crystal display element which uses a nematic liquid crystal material having a specific refractive index. As an example of prior art, PTL 2 describes in paragraph [0002] that a color liquid crystal display element composed of a liquid crystal cell including color filters and a pair of polarizing films sandwiching the liquid crystal cell performs color display by changing optical transmittance on a color filter basis. PTL2 further describes in paragraph [0004] that a conventional color liquid crystal display panel using color filters produces colored light by causing the color filters to absorb light having a specific wavelength and, therefore, the amount of transmitted light decreases and display becomes dark. In other words, PTL 2 investigates only the performances of the display panel, and no consideration is given to the use of the display panel for eyeglasses or other applications.

CITATION LIST

Patent Literature

PTL 1
Japanese Patent Application Laid-Open No. 2008-181064
PTL 2
Japanese Patent Application Laid-Open No. 10-096887

SUMMARY OF INVENTION

Technical Problem

An object of the present invention is to provide a practical color changeable optical filter capable of changing the hue or chroma by using a relatively simple structure, and eyeglasses including the same.

Solution to Problem

The present inventors have conducted intensive studies to achieve the object described above, and found that using a rotation of a polarization plane to change the hue or chroma of transmitted light is very effective. The present invention has been completed based on the above findings.

That is, the present invention is specified by the following items:

[1] A color changeable optical filter comprising: two or more polarizers each containing a dichromatic pigment, and a frame that supports the two or more polarizers, wherein relative rotation of either a polarization plane of light entering at least one of the two or more polarizers or a polarization plane of light exiting at least one of the two or more polarizers changes hue or chroma of transmitted light through the optical filter.

[2] The color changeable optical filter according to [1], wherein at least one of the two or more polarizers is a chromatic polarizer.

[3] The color changeable optical filter according to [1], wherein the relative rotation of the polarization plane is a rotation of at least one of the two or more polarizers itself.

[4] The color changeable optical filter according to [1], wherein the relative rotation of the polarization plane is a rotation controlled by voltage applied to a liquid crystal device interposed between plurality of the polarizers.

[5] The color changeable optical filter according to [1], wherein the color changeable optical filter is a color distinction tool for a color-blind person.

[6] The color changeable optical filter according to [5], wherein the transmitted light changes from white light to red light or green light by the relative rotation of the polarization plane.

[7] The color changeable optical filter according to [1], further comprising a color filter for changing a color range to another color range which is different from a color range based on colors of the dichromatic pigments of the two or more polarizers.

[8] Eyeglasses comprising the color changeable optical filter according to any one of [1] to [7].

Advantageous Effects of Invention

The present invention can provide a practical color changeable optical filter capable of changing the hue or chroma by using a relatively simple structure and further provide eyeglasses including the color changeable optical filter. The present invention can particularly provide a color changeable optical filter which enables transmitted light to have high lightness during typical usage and to have low lightness but a large chroma when the hue or chroma is changed as required.

DESCRIPTION OF EMBODIMENTS

<Polarizer>

Figure 1:
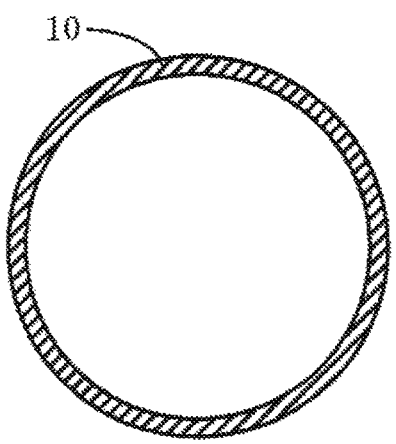
FIG. 1 is a front view showing one form of a frame for a color changeable optical filter according to the present invention.

In the present invention, a "polarizer" means a member itself having a polarizing capability, and there is no particular limitation to the shape of the polarizer. Further, in the present invention, a "polarizing plate" means a member which is an optically transparent, plate-shaped substrate having a polarizer provided thereon. Generally, an "optical filter" means a filter used to change the optical characteristics of light that is incident on and transmitted through the filter. In the present invention, a "color changeable optical filter" means a device having a mechanism for rotating polarization planes relative to each other, so as to change the hue or chroma of especially the transmitted light. There is no particular limitation to the shape of the polarizer, but a film form is preferred. A polarizer in a film form can be laminated on a desired substrate and used as a polarizing plate. The polarizer may be made of, for example, polyester, polyvinyl alcohol, or any other resin. Specifically, a stretched film of polyester or polyvinyl alcohol can be preferably used as the polarizer. However, other conventional polarizers exclusive of a stretched film may be used. Further, when the polarizer is used in a specific application, such as eyeglasses for vision correction, the polarizer may be attached, as required, to a substrate in the form of a prescribed lens.

The polarizer used in the present invention contains a dichromatic pigment. The dichromatic pigment typically has a transition moment which is larger in the major axis direction than in the minor axis direction, or has a transition moment which is larger in the minor axis direction than in the major axis direction, and the polarizer exhibits its functions by virtue of such a dichromatic pigment. There is no particular limitation to the dichroic ratio of the pigment and use can be made of a dichroic ratio appropriate for a specific application of the optical filter. In the present invention, a variety of known dichromatic pigments can be used. Examples of the pigments include an azo-based pigment, an anthraquinone-based pigment, a perylene-based pigment, an indanthrone-based pigment, and an imidazole-based pigment, but are not limited to these pigments.

For changing the hue or chroma, at least one polarizer preferably contains a dichromatic pigment which shows high absorbance for visible light having a specific wavelength, and assumes a color which is not black or gray. The hue of the colored polarizer may be, for example, red, green, blue, cyan, magenta, or yellow. The color of the colored polarizer is not restricted by lightness or chroma. In particular, a low-chroma polarizer is preferably used in combination with a colored polarizer. In general, a low-chroma color, such as white, gray, or black, is a color which is difficult for a person to perceive a difference in hue irrespective of the magnitude of the lightness of the color. In view of the above, in the color changeable optical filter of the present invention, at least one of two or more polarizers is a chromatic polarizer (that is, not an achromatic polarizer which is black, gray, or white). On the other hand, in a conventional liquid crystal display element (for example, color liquid crystal display element using nematic liquid crystal material), only an achromatic (for example, gray) polarizer is typically used. The reason for this is that a typical liquid crystal display element, unlike the present invention, is not designed to provide the function of changing hue or chroma.

According to the present invention, a chromatic color is a color having a chroma $C^*$ of 5 or more. In applications for color-blind persons, the chromatic polarizer having a large chroma $C^*$ is preferred for increasing the amount of change in chroma occurring upon the rotation of the polarizer. Specifically, chroma $C^*$ is 10 or more, more preferably 15 or more. Further, in applications for color-blind persons, high lightness value is preferred in view of the user's visibility and, therefore, the chromatic polarizer having a high lightness $L^*$ is preferred. Specifically, the lightness $L^*$ is preferably 50 or more, more preferably 60 or more. However, an increase in chroma $C^*$ of the chromatic polarizer results in increase in the amount of absorbed light, and the lightness $L^*$ of the chromatic polarizer tends to decrease. In view of the above, endless increase in the sum $(C^*+L^*)$ of the chroma $C^*$ and the lightness $L^*$ is difficult, and a polarizer having a $(C^*+L^*)$ value of 110 or less is practical as the chromatic polarizer in applications for color-blind persons. On the other hand, since chromatic polarizer having both high chroma $C^*$ and high lightness $L^*$ is preferred, in the applications for color-blind persons, the $(C^*+L^*)$ value is preferably 80 or more, more preferably 85 or more . However, to achieve both satisfactory chroma $C^*$ and lightness $L^*$ of the chromatic polarizer, too high chroma $C^*$ and lightness $L^*$ are not preferred, and chroma $C^*$ is preferably 50 or less, more preferably 40 or less. Further, the lightness $L^*$ of the chromatic polarizer is preferably 95 or less.

In applications other than those for the color-blind persons, for example, eyeglasses, goggles, imaging apparatus, display apparatus, and electric/electronic instruments, the chroma $C^*$ of the chromatic polarizer can be selected so that the change in chroma caused by the optical filter is suitable for each application. In the applications of eyeglasses and goggles, since a user's visibility needs to be considered as in applications for color-blind persons described above, the preferable range of the lightness $L^*$ is the same as that of the applications for color-blind persons. However, an employable lightness $L^*$ varies in other applications. Specifically, the lightness $L^*$ is preferably 10 or more, more preferably 30 or more, still more preferably 50 or more, and preferably 100 or less, more preferably 95 or less. The chroma $C^*$ is preferably 10 or more, more preferably 15 or more, and preferably 50 or less, more preferably 40 or less. The $(C^*+L^*)$ value is preferably 80 or more, more preferably 85 or more.

In the present invention, however, the color of the chromatic polarizer is not limited to any of the ranges described above. Further, in the present invention, an achromatic color means a color that is not a chromatic color and belongs to a color region of low chroma including black, gray, and white. However, the achromatic color is not limited to black, gray or white.

For example, in a case where a gray polarizer (the polarizer preferably having high transmittance along the polarization plane, but having low transmittance along the plane perpendicular to the polarization plane, and also having low chroma) is used in combination with a red polarizer (the polarizer preferably having high transmittance over the entire wavelength range along the polarization plane, generating red transmitted light at a plane perpendicular to the polarization plane due to transmittance that varies in accordance with the wavelength along the plane perpendicular to the polarization plane, and having high chroma), and when the relative angle between the polarization planes of the two polarizers is 0°, that is, when the polarization planes are parallel to each other, white transmitted light is obtained. When the relative angle between the polarization planes is 90°, red transmitted light is obtained, whereby a red portion of an object under observation is perceived as red, but, for example, with respect to a green portion of the object, the transmittance of the transmitted light decreases and the lightness decreases accordingly. As a result, the difference in lightness allows a red/green-blind person to distinguish between the red portion and the green portion.

Further, for example, when the gray polarizer is used in combination with a green polarizer (the polarizer preferably having high transmittance over the entire wavelength range along the polarization plane, generating green transmitted light at a plane perpendicular to the polarization plane due to transmittance that varies in accordance with the wavelength along the plane perpendicular to the polarization plane, and having high chroma), and when the relative angle between the polarization planes is 90°, green transmitted light is obtained, whereby a green portion of an object under observation is perceived as green, but, for example, with respect to a red portion of the object, the transmittance of the transmitted light decreases and the lightness decreases accordingly. As a result, the difference in lightness allows a red/green-blind person to distinguish between the red portion and the green portion of the object under observation.

In the above examples of specific combinations, explanation has been made especially on the red portion and the green portion of the object under observation, but the present invention is not limited thereto. That is, when the color of each portion of the object under observation is conceived after separating into the three primary colors of light, the transmittance of transmitted light carrying green or blue component decreases in the former case, whereas the transmittance of the transmitted light carrying red or blue component decreases in the latter case and, therefore, identification of each portion based on lightness becomes possible.

In the present invention, rotation of a polarization plane changes the hue or chroma of transmitted light, and a specific pattern of the change may be set as appropriate in accordance with a specific application of the optical filter. For example, in an application as a color distinction tool for a red/green-blind person to distinguish between red and green, a large change in a* value and a small change in b* value in the CIE 1976 (L*, a*, b*) color space is preferred, as will be shown in Examples below. The reason for this is that a change in a* value is effective for distinction between red and green. In this case, magnitude of the change in a* value is preferably 20 or more, and magnitude of the change in b* value is preferably smaller than the magnitude of the change in a* value. It should be noted that the easiness for a color-blind person to distinguish between red and green increases as the magnitude of the change in a* value increases; however, in some cases, there is a preference for suppressing the change in color because the user does not favor being recognized as a color blind by others. In such cases, the change in color can be suppressed to a small value by setting the angle of rotation of the polarization planes at a value below 90°.

For example, in the application as the color distinction tool, preferred is a large change in transmittance caused by the rotation of the polarization plane. As the visible light absorption characteristics of the polarizers, when k1 is the transmittance of light linearly polarized in a maximum transmittance direction at the non-polarized light minimum transmittance wavelength, and k2 is the transmittance of light linearly polarized in a direction perpendicular to the maximum transmittance direction at the non-polarized light minimum transmittance wavelength, the smaller the k2/k1 value is, the larger the change in transmittance caused by the rotation of the polarization planes. For distinguishing among colors, the k2/k1 value is preferably 0.9 or less, more preferably 0.8 or less. On the other hand, in some cases, there is a preference for suppressing the change in color because the user does not favor being recognized as a color blind by others. In such a case, the k2/k1 value is preferably set at a value in accordance with the preference of the color-blind person.

The two or more polarizers used in the present invention may each directly use the color based on the dichromatic pigment. Alternatively, the two or more polarizers may concurrently use another color filter for changing the color range of the polarizer to another color range. Such a color filter may also use a dichromatic pigment. Further, another pigment may be added to the polarizer itself or the substrate of the polarizing plate to change the color range.

<Frame>

There is no particular limitation with respect to a frame used in the present invention as long as the frame is capable of supporting the polarizer itself or a member (for example, a polarizing plate) including the polarizer. A specific shape of the frame will be described later because the shape of the frame differs between an embodiment where the polarizer itself is rotated and an embodiment where a liquid crystal device is used.

<Embodiment in Which Polarizer Itself is Rotated>

Figure 2:
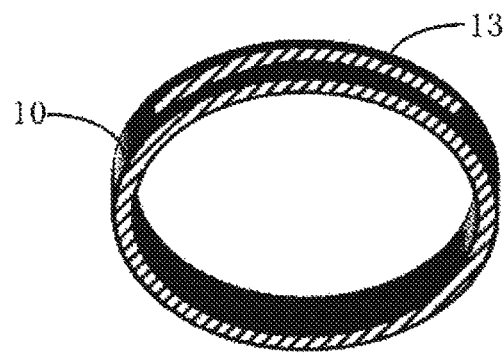
FIG. 2 is a perspective view showing the one form of the frame for the color changeable optical filter according to the present invention.
Figure 3:
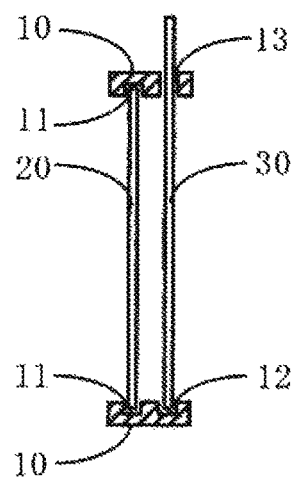
FIG. 3 is a cross-sectional view showing one form of the color changeable optical filter according to the present invention.

In the present embodiment, at least one of the polarizer itself is rotated to relatively rotate the polarization planes. For example, as a configuration for rotating the polarizer itself, columnar frame 10 as shown in FIGS. 1 and 2 is used. On the inner surface of frame 10 are formed groove 11 for fixing fixed polarizing plate 20 and groove 12 for supporting rotary polarizing plate 30 as shown in FIG. 3. Further, in a part of groove 12 is formed slit 13 passing therethrough from the inner side to the outer side.

Figure 4:
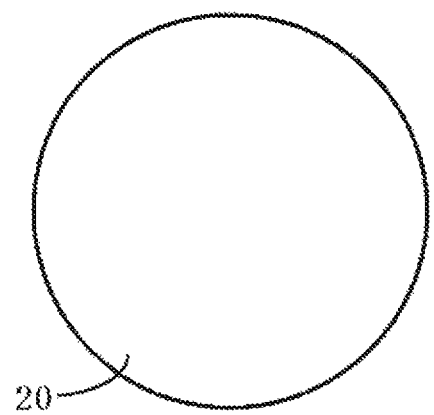
FIG. 4 is a front view showing one form of a fixed polarizer of the color changeable optical filter according to the present invention.
Figure 5:
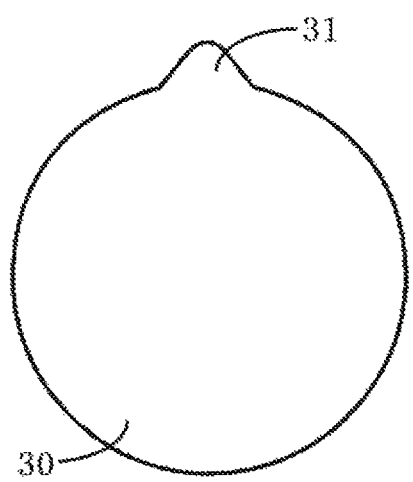
FIG. 5 is a front view showing one form of a rotary polarizer of the color changeable optical filter according to the present invention.

Fixed polarizing plate 20 has a disc shape, as shown in FIG. 4. Rotary polarizing plate 30, as shown in FIG. 5, has a disc-like shape with protrusion 31 provided at part of the disc-like shape. As shown in FIG. 3, fixed polarizing plate 20 is fit into groove 11 of frame 10, and rotary polarizing plate 30 is fit into groove 12 of frame 10. Protrusion 31 of rotary polarizing plate 30 protrudes through slit 13. Grabbing and moving protrusion 31 allows rotary polarizing plate 30 to be rotated over a range from 0° to 90°. The thus configured color changeable optical filter changes the hue or chroma of transmitted light by manual rotation of rotary polarizing plate 30 itself.

Figure 6:
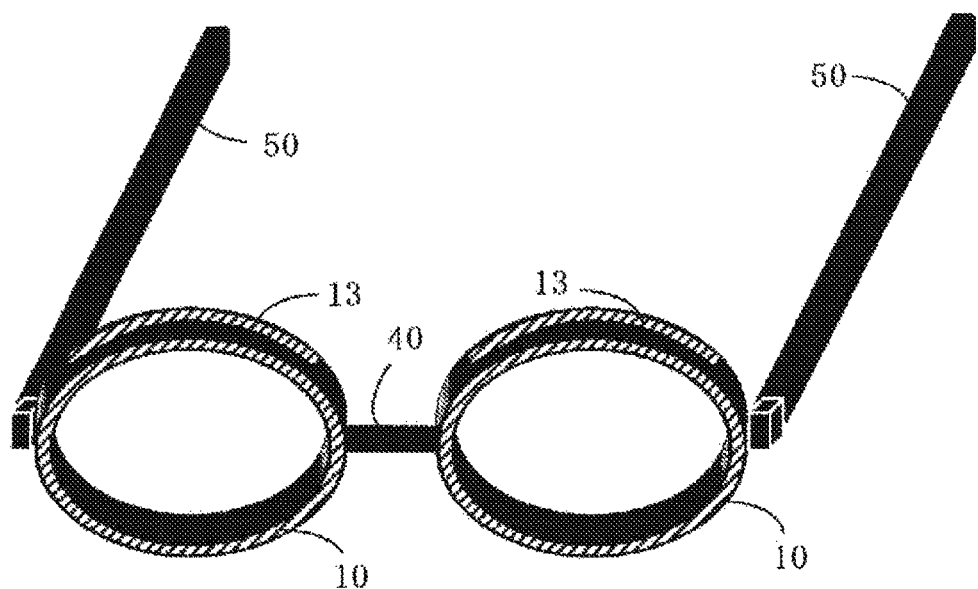
FIG. 6 is a perspective view showing one form of eyeglasses including the color changeable optical filter according to the present invention.

Further, as shown in FIG. 6, eyeglasses of the present invention can be obtained by bonding two frames 10 to each other via bridge 40, and attaching temples 50 to two frames 10.

In the embodiment in which the polarizer itself is rotated, the frame used needs to have a structure that enables at least one of the two or more polarizers to rotate mechanically. In the embodiment shown in FIGS. 1 to 6, groove 12 and slit 13 of frame 10 correspond to the structure that enables rotary polarizing plate 30 itself to rotate mechanically.

Since the embodiment shown in FIGS. 1 to 6 is a form for use as eyeglasses, parts (bridge 40 and temples 50) for fixing the eyeglasses to a person's face are further added to frame 10. However, the present invention is not limited to such a form. In an application other than eyeglasses (application as magnifying lens, for example), the fixing parts are not necessary.

In the embodiment shown in FIGS. 1 to 6, rotary polarizing plate 30 is mechanically rotated by hand, but the present invention is not limited to such an embodiment. As an alternative, for example, rotary polarizing plate 30 may be mechanically rotated by using mechanical or electric power.

The form, like the present embodiment, in which the relative rotation of the polarization planes is the rotation of at least one polarizer itself, is advantageous over an embodiment which uses a liquid crystal device. The advantageous are low cost, uneasy to be broken, lightweight, capability of semipermanent use without being restricted by the life of a liquid crystal material. Especially in the form in which the rotation is achieved by hand or mechanical power, there are additional advantageous, such as being free from problems concerning waterproofness and flat battery.

The embodiment described above relates to eyeglasses so configured to change the hue or chroma of the transmitted light through the entire lens, but the present invention is not limited to such an embodiment. The eyeglasses may instead be so configured to change the hue or chroma of the transmitted light through only part of the lens (for example, only upper portion of the lens, only lower portion of the lens, only central portion of the lens, or only a part of an outer peripheral portion of the lens). Such a configuration is advantageous for ensuring sufficient brightness by maintaining light transmitted through other portions of the lens, and suppressing the disadvantageous decrease in lightness of the transmitted light.

<Embodiment Which Uses Liquid Crystal Device>

In the present embodiment, relative rotation of the polarization planes are achieved by controlling the voltage applied to a liquid crystal device interposed between plurality of the polarizers. As an example of a configuration using a liquid crystal device, in FIG. 7, a laminated structure (liquid crystal device) containing transparent electrode 61/orientation film 62/nematic liquid crystal material 63/orientation film 62/transparent electrode 61 is interposed between two polarizing films 60, and the relative rotation of the polarization planes can be achieved by applying voltage between two transparent electrodes 61.

When the color changeable optical filter using the above liquid crystal device is incorporated into a desired frame, and used as a substitute for frame 11 of the eyeglasses shown in FIG. 6, the resultant eyeglasses do not require manual operation as described for the above embodiment. In this case, however, the frame needs to be provided with a voltage application means or connected electrically to a voltage application means.

Figure 7:
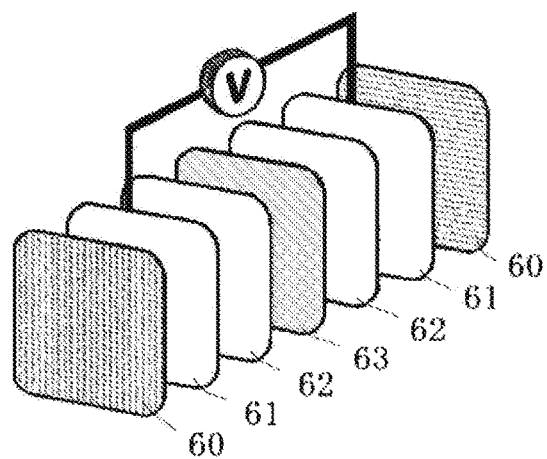
FIG. 7 is a cross-sectional view showing one form of the color changeable optical filter according to the present invention.

In the embodiment shown in FIG. 7, a seven-layer laminate structure containing polarizing film 60/liquid crystal devices (61, 62, 63, 62, 61)/polarizing film 60 is used, but the present invention is not limited to such an embodiment. A color filter for changing the color range may be added to the laminate structure. As an alternative, a polarizing film for controlling a color different from the color handled by the above laminate structure may be used to form a color changeable optical filter capable of controlling two colors, three colors, . . . , or multiple colors. For example, polarizing film 60' for controlling another color may be used as a color changeable optical filter capable of controlling two colors. Specifically, a laminate containing liquid crystal devices (61, 62, 63, 62, 61)/polarizing film 60' is further added to and laminated with the above laminate structure to thereby obtain a 13-layer laminate structure. Appropriately selecting two colors enables the obtainment of arbitrary hue and chroma. Similarly, a color changeable optical filter capable of controlling three colors has a 19-layer laminate structure. Appropriately selecting three colors enables the control of not only arbitrary hue and chroma, but also lightness.

The form, like the present embodiment, in which the relative rotation of the polarization plane is achieved by controlling the voltage applied to the liquid crystal device interposed between the plurality of polarizers is more practical as compared to the control structure, such as that described in PTL 1, in which a specific liquid crystal material (such as a cholesteric liquid crystal material) is used to reflect light having a certain wavelength. The reasons are simpler structure and smaller number of parts. Further, use of a cholesteric liquid crystal material, as in PTL 1, causes the wavelength of the transmitted light to undesirably change in accordance with the viewing angle. In contrast, as in the present invention, use of a liquid crystal material (such as nematic liquid crystal material) which achieves relative rotation of the polarization planes is very advantageous for specific applications, such as eyeglasses, because the wavelength of the transmitted light is maintained at a constant value without being changed in accordance with the viewing angle. That is, in a specific application, such as eyeglasses, a color change caused by a small shift in the position of the user's eyes or in a relative positional relationship between an object to be perceived and the position of the optical filter is very inconvenient for the user. When the form which uses a liquid crystal device and the form which uses the mechanical rotation of the polarizer itself are compared, the advantages of using the liquid crystal device are that the shape of the polarizer are free from any restrictions and that operation for on and off of the rotation is easy.

EXAMPLES

The present invention will be described below in more detail in the form of Examples. However, the present invention is not limited to these Examples.

<Method for Measuring Color of Transmitted Light>

To measure the color of the transmitted light through the optical filter, the spectral colorimeter SE-2000 manufactured by NIPPON DENSHOKU INDUSTRIES CO., LTD. was used. The light source was set at D65/10, and results of the measurement of the color were expressed by CIE 1976 (L*, a*, b*) color space, where L* represents lightness, a* represents red, and b* represents yellow. The chroma C* and hue ∠H° were calculated in accordance with the following equations. However, when a*>0 and b*<0, 360° is added to the value of ∠H° and when a*<0, 180° is added to the value of ∠H° so that ∠H° value falls within the range of from 0° to 360°.

$$C^* = \sqrt{a^{*2} + b^{*2}}$$

$$\angle H° = \tan^{-1}(b^*/a^*) 2\pi \times 360 \qquad [1]$$

<Production of Polarizing Plate>

First, as the polarizers, the following commercially available colored polarizing films (sold by MATSUKEN K.K.) were provided.

Gray polarizer (L*=70.8, a*=−2.6, b*=3.4, C*=4.3, hue=128°)

Red polarizer (L*=78.7, a*=26.7, b*=4.3, C*=27.1, hue=9°)

Green polarizer (L*=76.7, a*=−19.7, b*=8.7, C*=21.6, hue=156°)

Blue polarizer (L*=79.4, a*=−8.1, b*=−16.0, C*=18.0, hue=243°)

The polarizing films were each attached to a colorless transparent base (acrylic plate having thickness of 2 mm) to produce a polarizing plate of each color.

Example 1

Color changeable optical filter shown in FIGS. 1 to 5 was prepared as mentioned below by using the gray polarizing plate as fixed polarizing plate 20, and the red polarizing plate as rotary polarizing plate 30.

Grooves 11 and 12 each having a width of 21 mm and a depth of 1 mm were formed in the inner surface of frame 10 formed of a columnar resin member having an outer diameter of 53 mm, an inner diameter of 50 mm, and a height of 6 mm. A part of groove 12 was further cut out to form slit 13. Slit 13 was formed so that its length is longer than a quarter of the perimeter of frame 10. The gray polarizing plate processed into a 51 mm diameter circle was fit into groove 11, thereby obtaining fixed polarizing plate 20. The red polarizing plate was processed into a shape which is a 51 mm diameter circle with protrusion 31 and was fit into slit 13 and groove 12, thereby obtaining rotary polarizing plate 30.

When the thus obtained rotary polarizing plate 30 made of the optical filter was rotated from 0° to 90°, the hue and chroma of the transmitted light actually changed. Specifically, when the angle of rotation of rotary polarizing plate 30 was 0°, the chroma of the transmitted light was low and white transmitted light (L*=63.8, a*=1.4, b*=3.9, C* =4.1, hue=70°) was obtained. When the angle of rotation of rotary polarizing plate 30 was 90°, red transmitted light was obtained, and the lightness of colors containing the green and blue components decreased (L*=36.7, a*=53.3, b*=14.4, C*=55.2, hue=15°).

Example 2

A color changeable optical filter was produced as in Example 1 except that the gray polarizing plate was used as fixed polarizing plate 20 and the green polarizing plate was used as rotary polarizing plate 30. When rotary polarizing plate 30 was rotated from 0° to 90°, the hue and chroma of the transmitted light actually changed. Specifically, when the angle of rotation of rotary polarizing plate 30 was 0°, the chroma of the transmitted light was low and white transmitted light (L*=62.3, a*=−7.8, b*=7.7, C*=10.9, hue =136°) was obtained. When the angle of rotation of rotary polarizing plate 30 was 90°, green transmitted light was obtained, and the lightness of colors containing the red and blue components decreased (L*=33.9, a*=−49.7, b*=14.6, C*=51.8, hue=164°).

Example 3

A color changeable optical filter was produced as in Example 1 except that the gray polarizing plate was used as fixed polarizing plate 20 and the blue polarizing plate was used as rotary polarizing plate 30. When rotary polarizing plate 30 was rotated from 0° to 90°, the hue and chroma of the transmitted light actually changed. Specifically, when the angle of rotation of rotary polarizing plate 30 was 0°, the chroma of the transmitted light was low and white transmitted light (L*=63.4, a*=−3.6, b*=3.1, C*=4.8, hue=139°) was obtained. When the angle of rotation of rotary polarizing plate 30 was 90°, blue transmitted light was obtained, and the lightness of colors containing the red and green components decreased (L*=37.7, a*=−19.5, b*=−27.3, C*=33.6, hue=234°).

Example 4

A color changeable optical filter was produced as in Example 1 except that the red polarizing plate was used as fixed polarizing plate 20 and the red polarizing plate was used as rotary polarizing plate 30. When rotary polarizing plate 30 was rotated from 0° to 90°, the chroma of the transmitted light actually changed. Specifically, when the angle of rotation of rotary polarizing plate 30 was 0°, red transmitted light was obtained (L*=72.4, a*=25.8, b*=8.2, C*=27.1, hue=18°). When the angle of rotation of rotary polarizing plate 30 was 90°, red transmitted light was obtained, but the lightness of colors containing the green and blue components decreased (L*=52.7, a*=69.5, b*=16.9, C*=71.5, hue=14°.

Example 5

A color changeable optical filter was produced as in Example 1 except that the red polarizing plate was used as fixed polarizing plate 20 and the green polarizing plate was used as rotary polarizing plate 30. When rotary polarizing plate 30 was rotated from 0° to 90°, the hue and chroma of the transmitted light actually changed. Specifically, when the angle of rotation of rotary polarizing plate 30 was 0°, the chroma of the transmitted light was low and white transmitted light (L*=63.0, a*=0.8, b*=5.7, C*=5.8, hue=82°) was obtained. When the angle of rotation of rotary polarizing plate 30 was 90°, orange transmitted light was obtained, and the lightness of colors containing the green and blue components decreased (L*=48.6, a*=13.8, b*=17.2, C*=22.1, hue=51°).

Example 6

A color changeable optical filter was produced as in Example 1 except that the red polarizing plate was used as fixed polarizing plate 20 and the blue polarizing plate was used as rotary polarizing plate 30. When rotary polarizing plate 30 was rotated from 0° to 90°, the hue and chroma of the transmitted light actually changed. Specifically, when the angle of rotation of rotary polarizing plate 30 was 0°, the chroma of the transmitted light was low and white transmitted light (L*=66.0, a*=5.5, b*=−4.1, C*=6.9, hue=323°) was obtained. When the angle of rotation of rotary polarizing plate 30 was 90°, violet transmitted light was obtained, and the lightness of colors containing the green component decreased (L*=51.4, a*=27.7, b*=−19.2, C*=33.7, hue=325°).

Example 7

A color changeable optical filter was produced as in Example 1 except that the green polarizing plate was used as fixed polarizing plate 20 and the green polarizing plate was used as rotary polarizing plate 30. When rotary polarizing plate 30 was rotated from 0° to 90°, the chroma of the transmitted light actually changed. Specifically, when the angle of rotation of rotary polarizing plate 30 was 0°, green transmitted light (L*=64.1, a*=−17.2, b*=10.5, C*=20.1, hue=149°) was obtained. When the angle of rotation of rotary polarizing plate 30 was 90°, green transmitted light was obtained, and the lightness of colors containing the red and blue components decreased (L*=47.7, a*=−64.7, b*=19.2, C*=67.5, hue=164°).

Example 8

A color changeable optical filter was produced as in Example 1 except that the green polarizing plate was used as fixed polarizing plate 20 and the blue polarizing plate was used as rotary polarizing plate 30. When rotary polarizing plate 30 was rotated from 0° to 90°, the hue and chroma of the transmitted light actually changed. Specifically, when the angle of rotation of rotary polarizing plate 30 was 0°, green transmitted light (L*=67.5, a* =−13.9, b*=3.8, C*=14.4, hue=165°) was obtained. When the angle of rotation of rotary polarizing plate 30 was 90°, bluish green transmitted light was obtained, and the lightness of colors containing the red component decreased (L*=50.7, a*=−43.3, b*=−13.7, C*=45.4, hue=198°).

Comparative Example 1

An optical filter was produced as in Example 1 except that the gray polarizing plate was used as fixed polarizing plate 20 and the gray polarizing plate was used as rotary polarizing plate 30. When the angle of rotation of rotary polarizing plate 30 was 0°, the chroma of the transmitted light was low, and gray transmitted light (L*=63.8, a*=−4.1, b*=6.1, C*=7.4, hue=124°) was obtained. When the angle of rotation of rotary polarizing plate 30 was 90°, the chroma of the transmitted light was low, and dark gray transmitted light was obtained. There was a change in lightness, but no change in the hue and chroma (L*=0.4, a*=0.1, b*=−0.7, C*=0.7, hue=277°).

Example 9

A color changeable optical filter was produced as in Example 1 except that the blue polarizing plate was used as fixed polarizing plate 20 and the blue polarizing plate was used as rotary polarizing plate 30. When rotary polarizing plate 30 was rotated from 0° to 90°, the chroma of the transmitted light actually changed. Specifically, when the angle of rotation of rotary polarizing plate 30 was 0°, blue transmitted light (L*=69.6, a*=−4.9, b*=−15.9, C*=16.6, hue=253°) was obtained. When the angle of rotation of rotary polarizing plate 30 was 90°, blue transmitted light was obtained, but the lightness of colors containing the red and green components decreased (L*=53.9, a*=−22.1, b*=−39.5, C*=45.2, hue =241°).

Example 10

A red×green–90° polarizing plate was produced in the same manner as other polarizing plates except that the red polarizer and the green polarizer were attached to each other at a rotation angle of 90°. A color changeable optical filter was produced as in Example 1 except that the red×green–90° polarizing plate (L*=49.9, a*=16.6, b*=17.6, C*=24.2, hue=47°) was used as fixed polarizing plate 20 and the gray polarizing plate was used as rotary polarizing plate 30. When rotary polarizing plate 30 was rotated from 0° to 45° and to 90° with respect to the red polarizer, the hue and chroma of the transmitted light actually changed. Specifically, when the angle of rotation of rotary polarizing plate 30 was 0°, green transmitted light was obtained, and the lightness of colors containing the red and blue components decreased (L*=31.8, a*=−46.9, b*=13.8, C*=48.8, hue=164°). When the angle of rotation of rotary polarizing plate 30 was 45°, the chroma of the transmitted light was low, and gray transmitted light (L*=30.6, a*=−0.2, b*=9.6, C*=9.6, hue=91°) was obtained. When the angle of rotation of rotary polarizing plate 30 was 90°, red transmitted light was obtained, and the lightness of colors containing the green and blue components decreased (L*=32.5, a*=47.5, b*=13.8, C*=49.5, hue=16°).

Example 11

A red×gray–30° polarizing plate was produced in the same manner as other polarizing plates except that the green polarizer and the gray polarizer were attached to each other at a rotation angle of 30°. A color changeable optical filter was produced as in Example 1 except that the green×gray–30° polarizing plate (L*=58.3, a*=−10.5, b*=7.6, C*=12.9, hue=144°) was used as fixed polarizing plate 20 and the red polarizing plate was used as rotary polarizing plate 30. When rotary polarizing plate 30 was rotated from 0° to 90° with respect to the red polarizer, the hue and chroma of the transmitted light actually changed. Specifically, when the angle of rotation was 0°, green transmitted light (L*=54.9, a*=−5.6, b*=7.5, C*=9.4, hue=127°) was obtained. When the angle of rotation of rotary polarizing plate 30 was 90°, red transmitted light was obtained, and the lightness of colors containing the green and blue components decreased (L*=28.8, a*=44.3, b*=13.5, C*=46.4, hue=17°).

Example 12

As shown in FIG. 6, two frames 10 were bonded to each other via bridge 40, and temples 50 were attached thereto to form an eyeglass-shaped frame. The polarizers were fit into two frames 10, as in Examples 1 to 11, to produce the eyeglasses of the present invention.

Example 13

As polarizing films 60 shown in FIG. 7, the following commercially available colored polarizing films (sold by MATSUKEN K.K.) were provided.
Gray polarizing film (L*=70.8, a*=−2.6, b*=3.4, C*=4.3, hue=128°)
Red polarizing film (L*=78.7, a*=26.7, b*=4.3, C*=27.1, hue=9°)
Green polarizing film (L*=76.7, a*=−19.7, b*=8.7, C*=21.6, hue=156°)
Blue polarizing film (L*=79.4, a*=−8.1, b*=−16.0, C*=18.0, hue=243°)

A liquid crystal polarization rotator (sold by ARCoptix S.A.) was provided as a nematic liquid crystal device, having a laminate structure of transparent electrode 61/orientation film 62/nematic liquid crystal material 63/orientation film 62/transparent electrode 61, which is to be interposed between two polarizing films 60 shown in FIG. 7. White transmitted light ($L^*=95.0$, $a^*=-1.1$, $b^*=6.1$, $C^*=6.2$, hue=100.19°) was obtained before voltage was applied to the liquid crystal device, and white transmitted light ($L^*=93.8$, $a^*=-1.0$, $b^*=6.1$, $C^*=6.2$, hue=99.5°) was obtained while applying a voltage of 9V to the device.

The gray polarizing film described above was attached to one side of the nematic liquid crystal device as one of polarizing film 60, and the red polarizing film described above was attached to the other side of the nematic liquid crystal device as the other polarizing film 60, to thereby produce a color changeable optical filter which uses the liquid crystal device shown in FIG. 7. When a voltage of 9 V was applied to the liquid crystal device, the hue and chroma of the transmitted light actually changed. Specifically, the transmitted light before the voltage application had low chroma and was white light ($L^*=62.6$, $a^*=0.9$, $b^*=6.0$, $C^*=6.1$, hue=81.7°). Red transmitted light was obtained during the application of the voltage of 9 V, and the lightness of colors containing the green and blue components decreased ($L^*=43.0$, $a^*=34.4$, $b^*=6.6$, $C^*=35.1$, hue=11.0°).

Example 14

A color changeable optical filter using the liquid crystal device shown in FIG. 7 was produced as in Example 13 except that the red polarizing film was replaced with the green polarizing film. When the voltage of 9 V was applied to the liquid crystal device, the hue and chroma of the transmitted light actually changed. Specifically, the transmitted light before the voltage application had low chroma and was white light ($L^*=65.2$, $a^*=-8.2$, $b^*=12.4$, $C^*=14.8$, hue=123.6°). Green transmitted light was obtained during the application of the voltage of 9 V, and the lightness of colors containing the red and blue components decreased ($L^*=49.6$, $a^*=-22.4$, $b^*=13.2$, $C^*=26.0$, hue=149.5°).

Example 15

A color changeable optical filter using the liquid crystal device shown in FIG. 7 was produced as in Example 13 except that the red polarizing film was replaced with the blue polarizing film. When the voltage of 9 V was applied to the liquid crystal device, the hue and chroma of the transmitted light actually changed. Specifically, the transmitted light before the voltage application had low chroma and was white light ($L^*=66.4$, $a^*=-4.6$, $b^*=7.6$, $C^*=8.9$, hue=121.0°). Blue transmitted light was obtained during the application of the voltage of 9 V, and the lightness of colors containing the red and green components decreased ($L^*=40.0$, $a^*=-20.7$, $b^*=-25.2$, $C^*=32.6$, hue=230.4°).

INDUSTRIAL APPLICABILITY

The color changeable optical filter of the present invention is useful in an application where a change in hue or chroma is desired. In particular, the present invention is very useful in an application where there is a desire for a viewer to recognize the change in hue or chroma of a part of an object being viewed. In this regard, the color changeable optical filter of the present invention is completely different from a typical liquid crystal display element. For example, the color changeable optical filter of the present invention is very useful in an application as a color distinction tool for a color-blind person, such as eyeglasses and a magnifying lens, or as sunglasses that change the hue or chroma. In addition, the color changeable optical filter of the present invention can be used for a clip-on magnifying lens and over-sunglasses. The application of the color changeable optical filter of the present invention is, however, not limited to those described above. For example, the color changeable optical filter of the present invention is useful in various applications, such as, for changing the hue or chroma of goggles (such as ski goggles) in accordance with weather, for easily viewing under seawater by reducing blue light, and for easily viewing inside the river by reducing the color of a riverbed. Further, the color changeable optical filter of the present invention is useful as a color correction optical filter of an imaging device (such as a camera or a video camera) and a display device (such as a display), and has applications in electric/electronic instruments, such as a sensor and an optical communication circuit which requires a change of the hue or chroma of light.

REFERENCE SIGNS LIST

10 Frame
11 Groove
12 Groove
13 Slit
20 Fixed polarizing plate
30 Rotary polarizing plate
31 Protrusion
40 Bridge
50 Temple
60 Polarizing film
61 Transparent electrode
62 Orientation film
63 Nematic liquid crystal material

The invention claimed is:

1. A color changeable optical filter for eyeglasses, comprising:
   two or more polarizers each containing a dichromatic pigment; and
   a frame that supports the two or more polarizers,
   wherein relative rotation of either a polarization plane of light entering at least one of the two or more polarizers or a polarization plane of light exiting at least one of the two or more polarizers changes hue or chroma of transmitted light through the optical filter, and at least one of the two or more polarizers is a chromatic polarizer of which chroma C* is 10 or more, and
   wherein the relative rotation of the polarization plane is mechanical rotation of at least one of the two or more polarizers itself.

2. The color changeable optical filter for eyeglasses according to claim 1, wherein the color changeable optical filter is a color distinction tool for a color-blind person.

3. The color changeable optical filter for eyeglasses according to claim 2, wherein the transmitted light changes from white light to red light or green light by the relative rotation of the polarization plane.

4. The color changeable optical filter for eyeglasses according to claim 1, further comprising: a color filter for changing a color range to another color range which is different from a color range based on colors of the dichromatic pigments of the two or more polarizers.

5. Eyeglasses comprising the color changeable optical filter for eyeglasses according to claim 1.

6. The color changeable optical filter for eyeglasses according to claim 1, wherein lightness $L^*$ of the chromatic polarizer is 50 or more.

7. The color changeable optical filter for eyeglasses according to claim 6, wherein the sum ($C^*+L^*$) of the chroma $C^*$ and the lightness $L^*$ is 110 or less.

8. The color changeable optical filter for eyeglasses according to claim 7, wherein the sum ($C^*+L^*$) of the chroma $C^*$ and the lightness $L^*$ is 80 or more.

9. The color changeable optical filter for eyeglasses according to claim 1, wherein when the rotation of the polarization plane changes the hue or chroma of transmitted light, magnitude of the change in a $a^*$ value of a CIE 1976 ($L^*$, $a^*$, $b^*$) is 20 or more, and magnitude of the change in a $b^*$ value is smaller than the magnitude of the change in the $a^*$ value.

10. The color changeable optical filter for eyeglasses according to claim 1, wherein when k1 is the transmittance of light linearly polarized in a maximum transmittance direction at a non-polarized light minimum transmittance wavelength, and k2 is the transmittance of light linearly polarized in a direction perpendicular to the maximum transmittance direction at the non-polarized light minimum transmittance wavelength, the k2/k1 value of the transmittance of light linearly polarized by the rotation of the polarization plane is 0.9 or less.

* * * * *